United States Patent [19]
Schmitt

[11] Patent Number: 6,164,612
[45] Date of Patent: Dec. 26, 2000

[54] SUPPORT WITH A COMPRESSION SPRING ARRANGED IN A TUBULAR ARM

[75] Inventor: Bernd Schmitt, Huenfeld-Michelsrombach, Germany

[73] Assignee: Wella Aktiengesellschaft, Darmstadt, Germany

[21] Appl. No.: 09/341,244

[22] PCT Filed: Nov. 19, 1998

[86] PCT No.: PCT/EP98/07421

§ 371 Date: Jul. 15, 1999

§ 102(e) Date: Jul. 15, 1999

[87] PCT Pub. No.: WO99/26014

PCT Pub. Date: May 27, 1999

[30] Foreign Application Priority Data

Nov. 19, 1997 [DE] Germany .......................... 197 51 048

[51] Int. Cl.[7] .................................................. E04G 3/00
[52] U.S. Cl. ................................ 248/280.11; 248/278.1; 248/276.1; 248/274.1
[58] Field of Search ........................... 248/280.11, 278.1, 248/276.1, 274.1

[56] References Cited

U.S. PATENT DOCUMENTS

| | | |
|---|---|---|
| 3,584,793 | 6/1971 | Ilzig . |
| 4,080,530 | 3/1978 | Krogsrud ...................... 248/280.11 X |
| 4,082,244 | 4/1978 | Groff . |
| 4,107,769 | 8/1978 | Saluja . |
| 4,160,536 | 7/1979 | Krogsrud ........................... 248/280.11 |
| 4,166,602 | 9/1979 | Nilsen et al. ................... 248/280.11 X |
| 4,770,384 | 9/1988 | Kuwazima et al. ........... 248/280.11 X |
| 5,004,368 | 4/1991 | Warga . |

FOREIGN PATENT DOCUMENTS 1 198 302  8/1965  Germany .

*Primary Examiner*—Leslie A. Braun
*Assistant Examiner*—A. Joseph Wujciak
*Attorney, Agent, or Firm*—Michael J. Striker

[57] ABSTRACT

The adjustable stand (1) includes a tubular arm (2); an arm joint (5) by which the tubular arm (2) is pivotally connected to a connection part (22); a spindle (6) in the tubular arm (2) that receives a compression spring (3) with a given pre-tensioning provided by a first spring stop (7) in the form of a washer and by a second spring stop (8). The spindle (6) has an axial extension (9) pivotally connected with the connection part (22) by means of a lever (11) The tubular arm (2) is provided with two opposing indentations (13) having a distance (X) from one another, the washer forming the first spring stop (7) has two opposing first sides (14) closer to each other than the distance (X) between indentations (13) and two opposing second sides (15) arranged rotated 90° to the first sides and further from each other than the distance (X) between indentations (13), so that the washer may pass by the indentations (13) during assembly and rotate 90° to take a bayonet locking position. The washer is formed so that, although the stand is easy to assemble, the washer cannot be easily disengaged from the bayonet locking position, but only deliberately by axially pressing in and rotating a structural unit (18) including the spindle, compression spring and lever so as to relieve the structural unit (18).

2 Claims, 5 Drawing Sheets

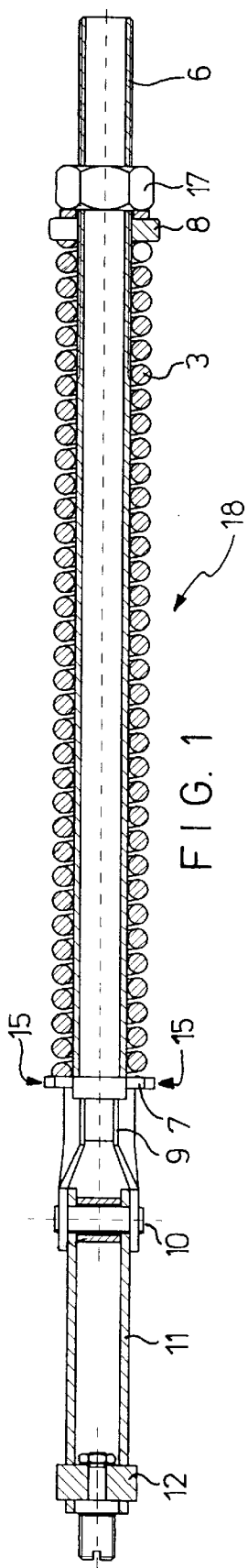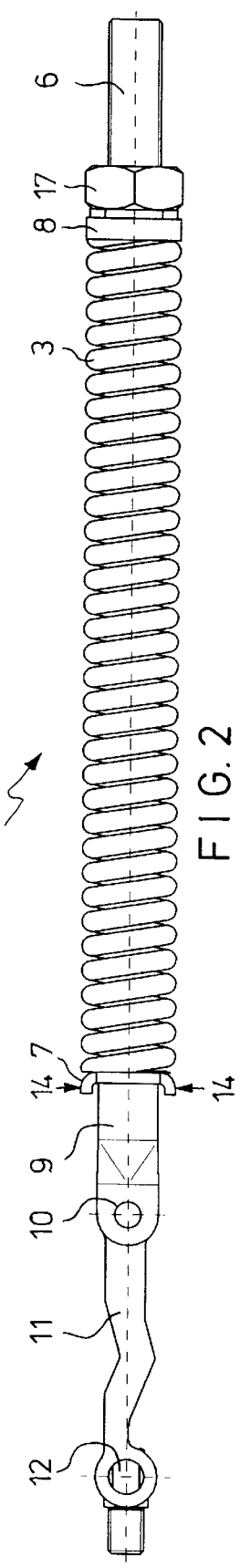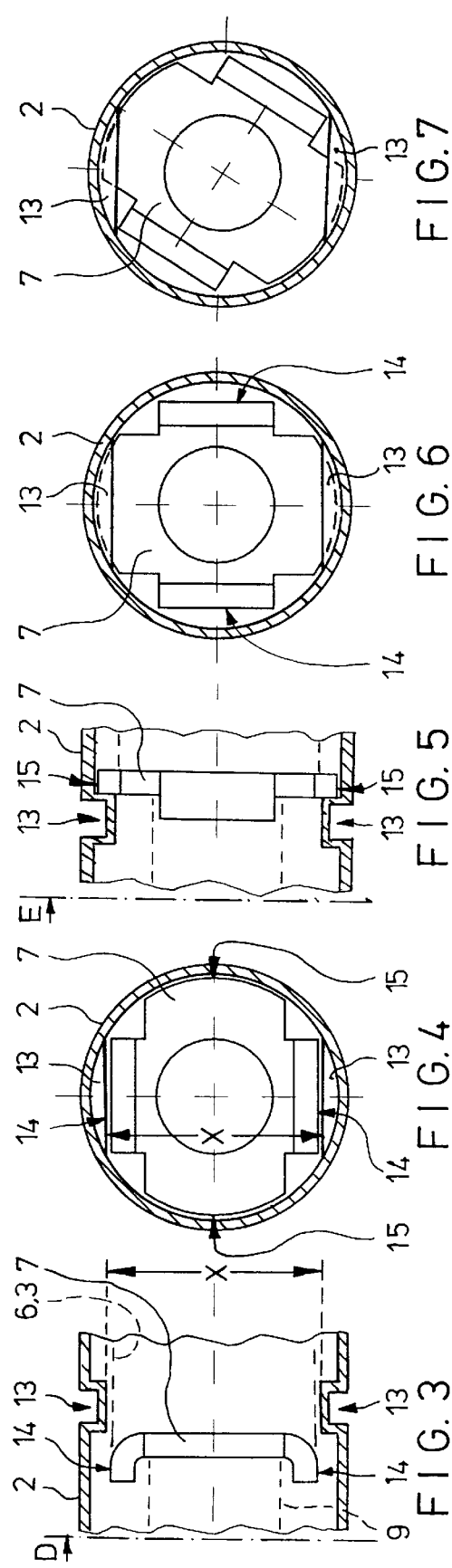

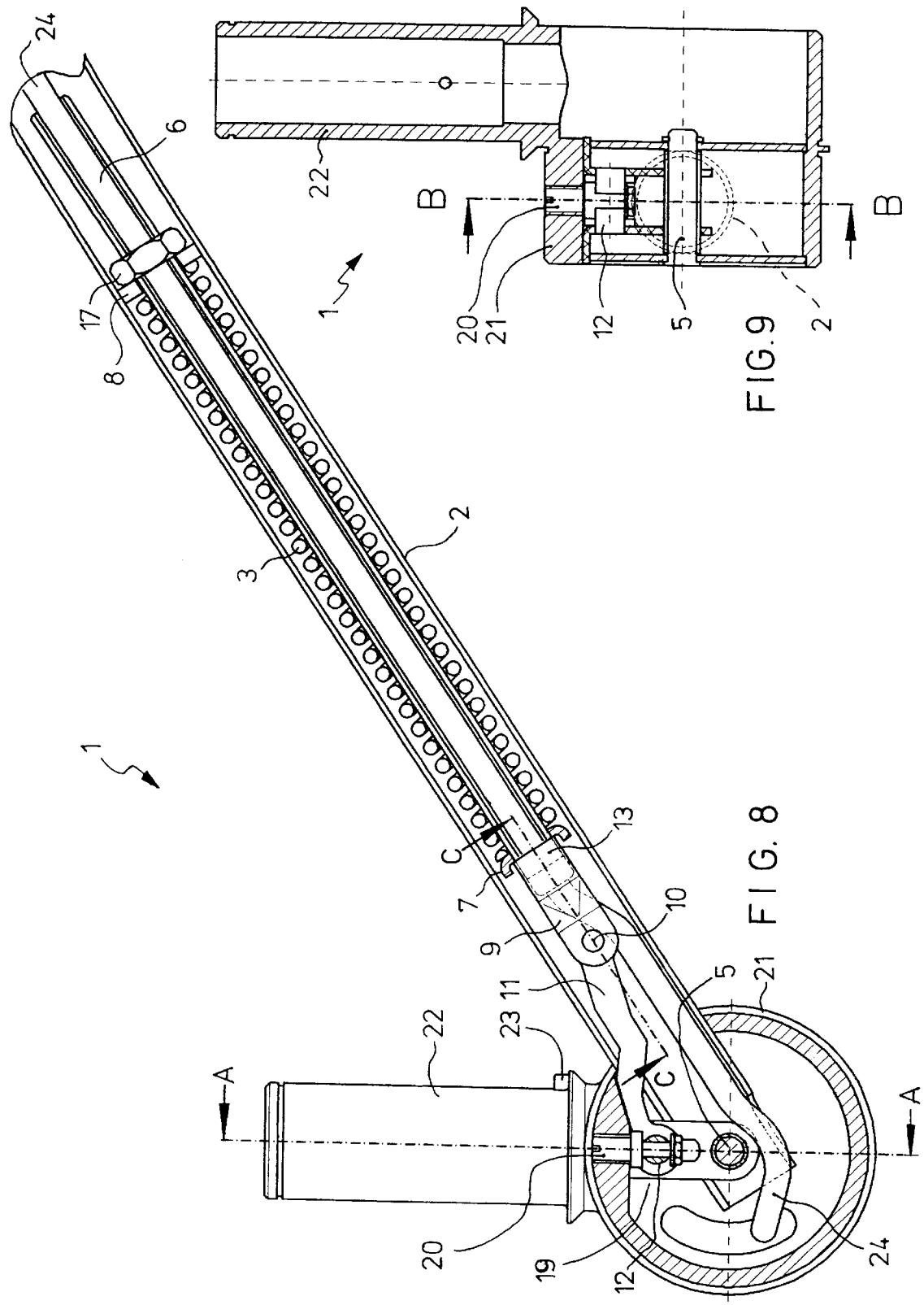

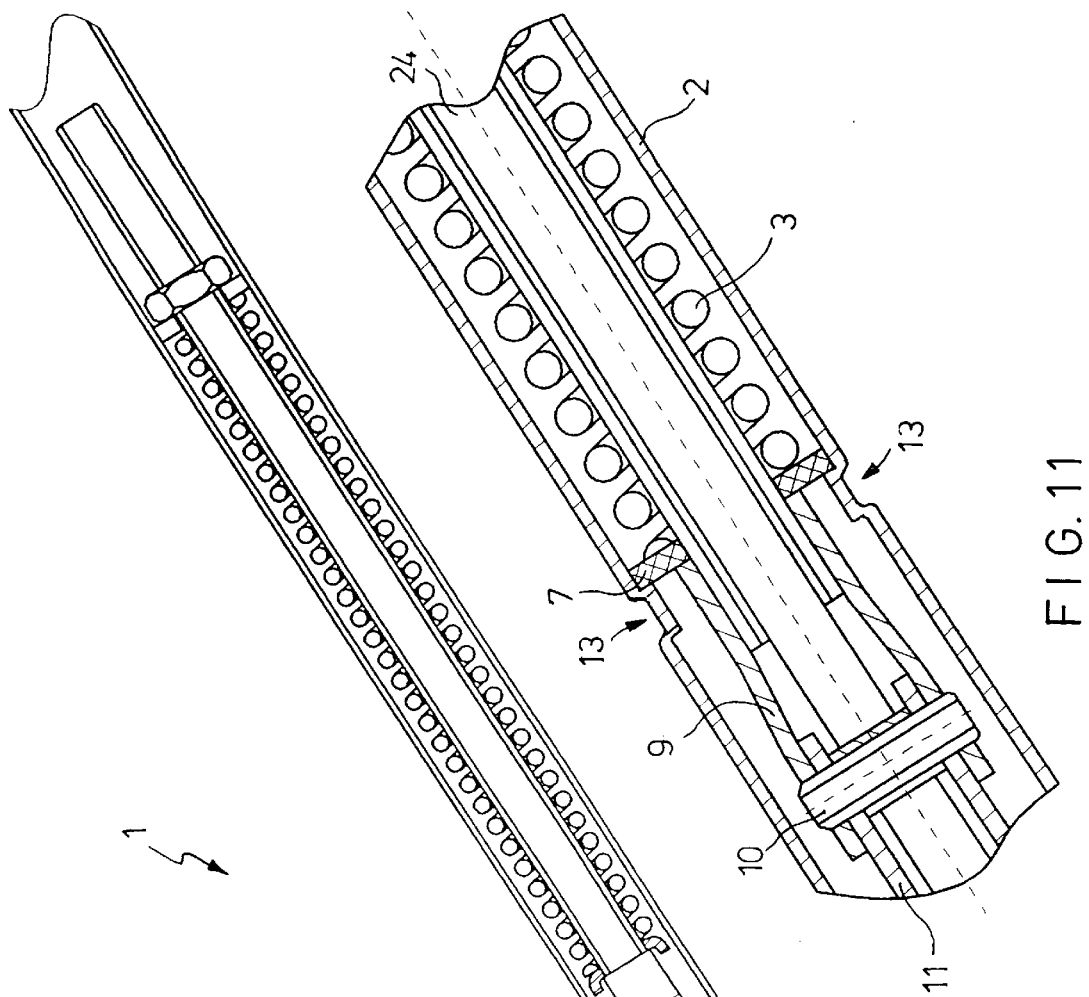
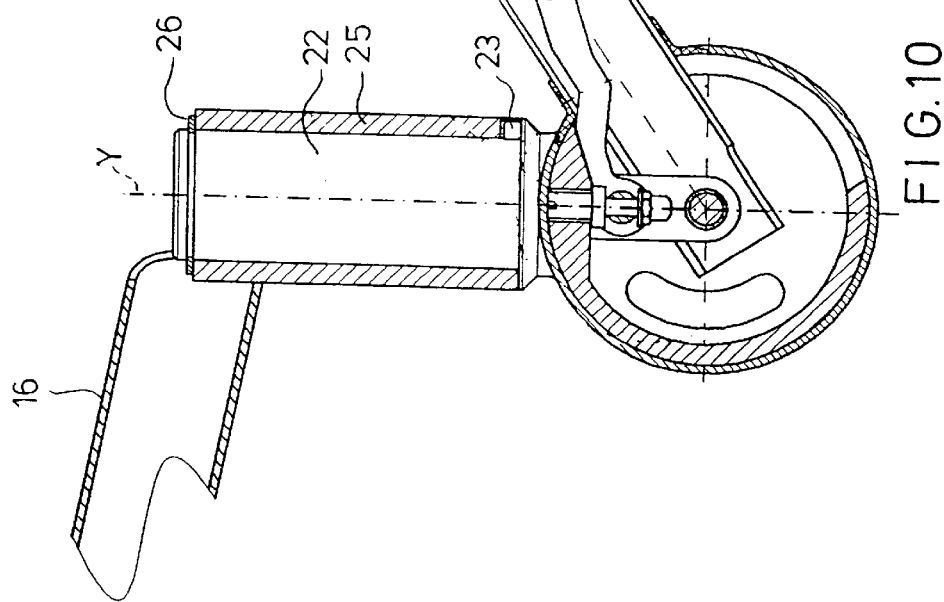

SUPPORT WITH A COMPRESSION SPRING ARRANGED IN A TUBULAR ARM

BACKGROUND OF THE INVENTION

The present invention relates to an adjustable stand or support for supporting a load, particularly a lamp or the like, in a manually predetermined vertical position, and, more particularly, to an adjustable stand or support for supporting a load, particularly, in a manually predetermined vertical position, comprising a tubular arm pivotally connected with a connecting piece or a vertical stand tube of the stand or support and means for weight compensation for the load including a compression spring with a predetermined pre-tensioning received on a spindle extending in the tubular arm.

Because of the construction design in known stands, the assembly of the compression spring for balancing of masses with respect to a supported load is very costly and therefore correspondingly cost-intensive.

SUMMARY OF THE INVENTION

It is the object of the invention to provide a stand of the aforementioned type which does not have the disadvantages mentioned above.

According to the invention the adjustable stand for supporting a load, especially a lamp, in a manually predetermined vertical position, includes a tubular arm to which the load is connected; an arm joint by which the tubular arm is pivotally connected to another part of the stand; a spindle arranged in the tubular arm and a compression spring received in a frictional engagement by the spindle with a given pre-tensioning by means of a first spring stop in the form of a washer through which the spindle extends and by a second spring stop. The spindle has an axial extension in the vicinity of the first spring stop pivotally connected with the another part by means of a lever pivotally connected by a first pivot joint to the axial extension and by a second pivot joint in the another part. The tubular arm is provided with two opposing indentations located in the vicinity of the first spring stop and having a distance from one another such that the washer forming the first spring stop has two opposing first sides closer to each other than the indentations are from each other and two opposing second sides arranged rotated 90° to the first sides and further from each other than the indentations are from each other, so that the washer may pass by the indentations during assembly and rotate 90° to take a bayonet locking position. The spindle, the first and second spring stops, the compression spring, the axial extension and the lever with a first and second pivot joint are constructed together as a structural unit. The first sides are formed so that, when the washer is in the bayonet locking position and is rotated axially, the first sides are jammed against the indentations, so that the second sides cannot be rotated out of the bayonet locking position unintentionally, but only deliberately by axially pressing in and rotating the structural unit so as to relieve the structural unit.

In a preferred embodiment the tubular arm has a circular cross-section, but the cross-section of the tubular arm can also be rectangular.

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a cross-sectional view through the structural unit formed of a compression spring and spindle;

FIG. 2 is a cross-sectional view through the structural unit according to FIG. 1, but rotated axially by 90 degrees;

FIGS. 3–7 are respective different cross-sectional views of an arm tube with indentations showing the interaction between the latter and a first spring stop;

FIG. 8 is a cross-sectional view of the arm tube in section B—B according to FIG. 9;

FIG. 9 shows the arm tube rotated by 90 degrees in a section A—A according to FIG. 8, FIG. 10 is a side cross-sectional view of the tubular arm with a stand tube which is connected by a pivot joint;

FIG. 11 shows an enlarged sectional view of section C—C from FIG. 8;

DESCRIPTION OF THE PREFERRED EMBODIMENT

Figure 12:
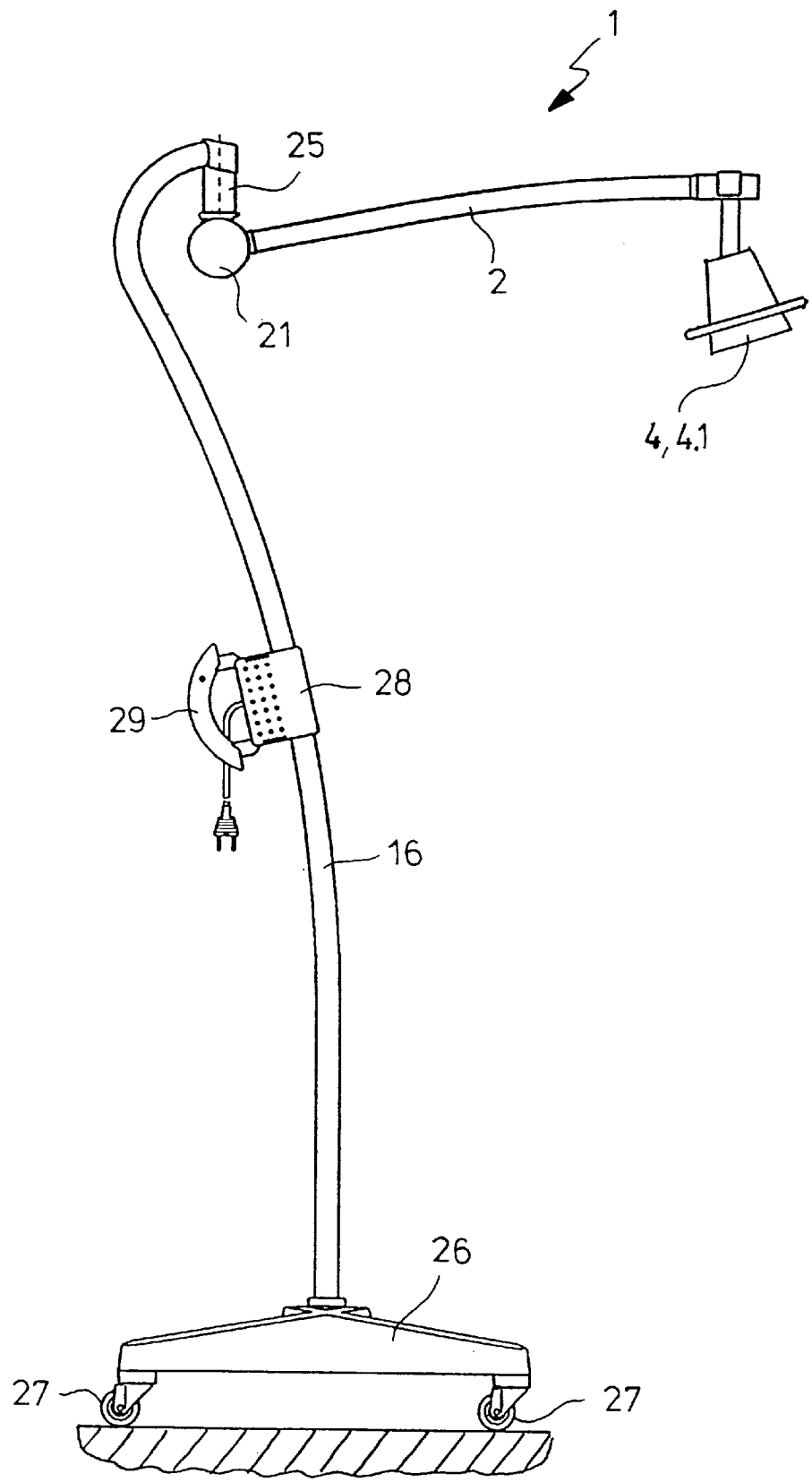
FIG. 12 is a side view of, its entirety, an embodiment example of a stand with a supported load.

The drawing shows a stand 1 (FIG. 12) with a compression spring 3 (FIGS. 1, 8) arranged in an tubular arm 2 (FIGS. 3, 8) for holding a load 4 (FIG. 12) in a manually predetermined vertical position by means of an arm joint 5 (FIG. 8). The compression spring 3 is received in a frictional engagement by a spindle 6 (FIG. 1) with a given pretensioning by means of a first spring stop 7 (FIG. 1) on the one hand and by means of a second spring stop 8 (FIG. 1) on the other hand. In the area of the first spring stop 7, the spindle 6 has an axial extension 9 (FIG. 1) which is connected, via a first joint 10 (FIG. 1), with a lever 11 (FIG. 1) which is connected at its end with a second joint 12 (FIG. 1). The tubular arm 2 is pivotally connected with the arm joint 5. The first spring stop 7 rests on the axial extension 9 by frictional engagement. The tubular arm 2 is provided with two oppositely located indentations 13 (FIG. 3) which have a distance X from one another, wherein the first spring stop 7 is provided in the shape of a washer, and two oppositely located first sides 14 (FIG. 3) have a distance from each other that is smaller than the distance X between the indentations, and two second sides 15 (FIG. 4) at a 90-degree rotation have a distance from each other that is greater than the distance X between the indentations, wherein the second sides 15 communicate with the indentations 13 in the manner of a quarter-turn fastener or bayonet lock.

In FIG. 1, the spindle 6, for example, a threaded spindle 1, is provided with a threaded nut 17 (spring force adjustment for weight compensation) which fixes the second spring stop 8. In the area of the first spring stop 7, the spindle 6 has an axial extension 9 in the shape of a fork which is connected, via a first joint 10, with a lever 11 which is connected at its end furthest from the first spring stop with a second joint 12 and is constructed as a structural unit 18 resulting in an added advantage with respect to assembly.

FIG. 2 shows a view according to FIG. 1 at a 90-degree axial rotation.

The interaction of the indentations 13 of the arm tube 2 with the first spring stop 7 is shown in more detail in FIGS. 3 to 7. For the sake of clarity, the axial extension 9 and the spindle 6 with the compression spring 3 have been omitted. FIG. 3 clearly shows that the distance between the two oppositely located first sides 14 of the first spring stop 7 is less than the distance X between the two indentations 13 such that these first sides 14, together as a constructional unit 18, can be pushed past these indentations 13 farther into the tubular arm 2 without hindrance.

A view D according to FIG. 3 is shown in FIG. 4.

After the first spring stop 7 has clearly passed the indentations 13, the spring stop 7 is turned 90 degrees by rotating the lever 11 and is drawn back to the indentations 13. This position is shown in FIG. 5 which clearly illustrates the bayonet-type locking.

A view E according to FIG. 5 is shown in FIG. 6.

The function of the bent first sides 14 of the first spring stop 7 is shown in more detail in FIG. 7. Due to the fact that the first sides 14 are bent, these first sides 14, when rotated axially, are jammed against the indentations 13 in such a way that the second sides 15 cannot be rotated out of the bayonet locking position unintentionally, but rather only deliberately by pressing in the constructional unit 18 axially and by rotating it axially by 90 degrees rotation and relieving it and drawing it out of the tubular arm 2.

The assembly and function of the structural unit 18 with the stand 1 is shown more fully in FIGS. 8 and 9, wherein section A—A according to FIG. 8 is shown in FIG. 9 and section B—B according to FIG. 9 is shown in FIG. 8. When the structural unit 18 has been inserted into the tubular arm 2 in the appropriate manner, the start of the tubular arm 2 is connected with the arm joint 5. The joint 12 of the lever 11 is connected with a joint receptacle 19, wherein the joint 12 can be adjusted by means of a set screw 20 that can be accessed from the outside for purposes of fine adjustment of the spring tension for adapting to loads. An upwardly directed hollow pin connection element 22 is arranged above a joint housing 21 and is provided with a rotation stop 23. A power supply cable 24, e.g., for a lamp 4.1, is arranged through the hollow pin connection element 22 and the hollow spindle 6. The following advantages result from the bayonet-type connection of the constructional unit 18 with the arm tube 2:

freedom of possible arrangements of the tubular arm 2 behind the rear spindle 6;

simple assembly of the compression spring 3 with the spindle 6.

no "blind assembly" in locations that are difficult to access.

Figure 14:
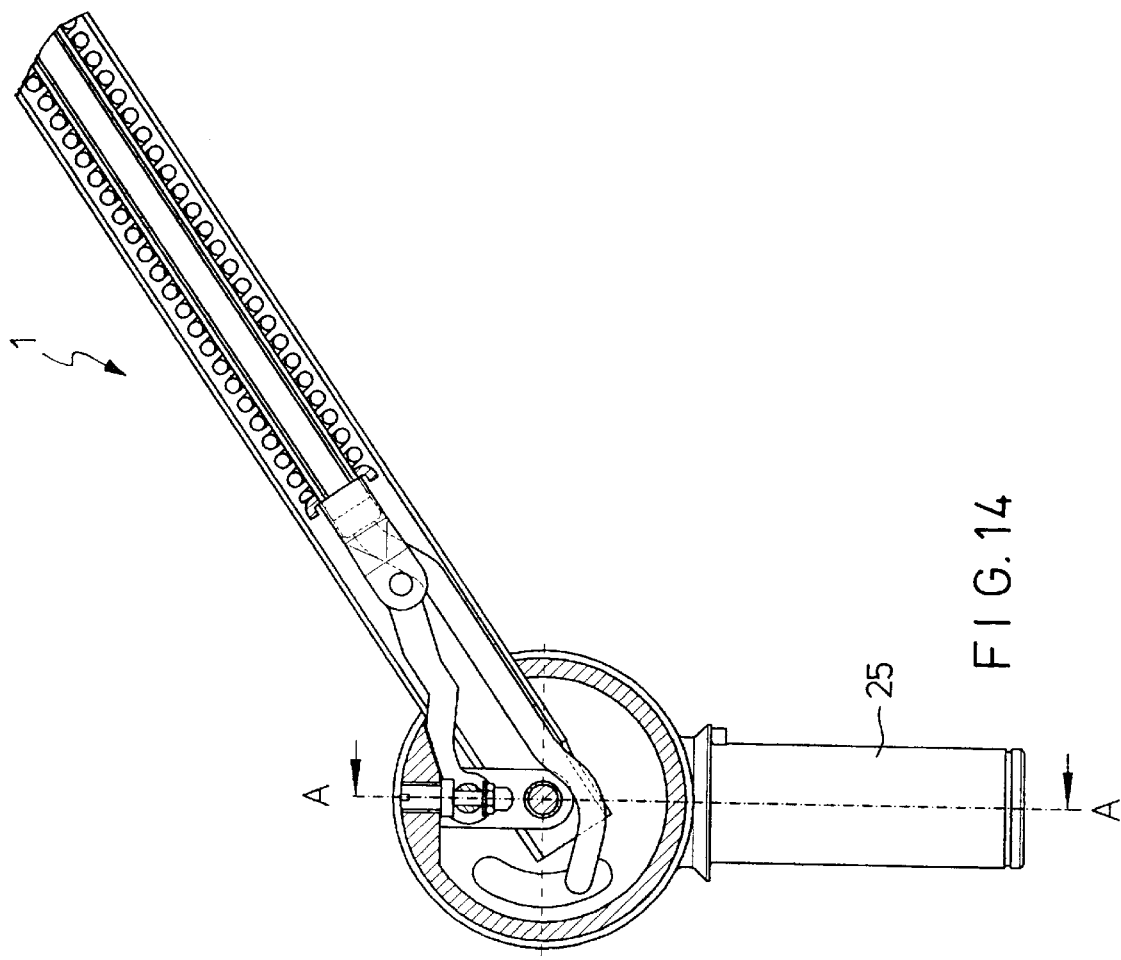
FIGS. 13 and 14 are respective cross-sectional views of the tubular arm according to FIGS. 8 and 9, but with a pivot joint arranged at the bottom.
Figure 13:
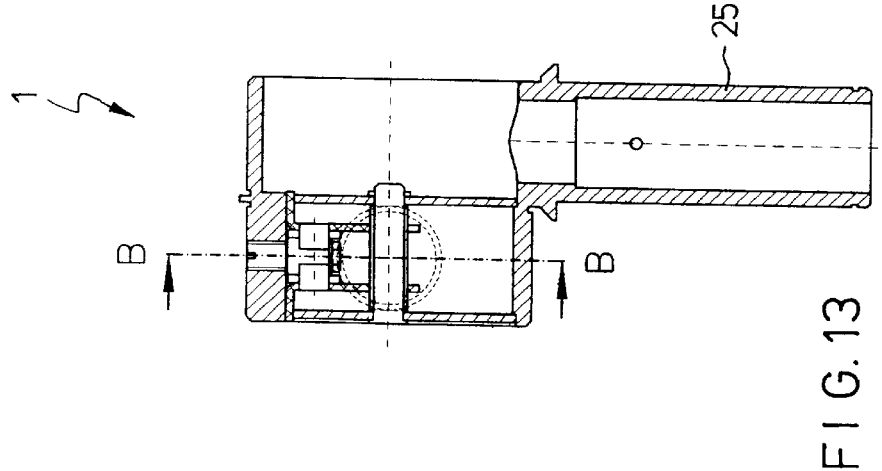

In FIG. 10, the portion of the stand as shown in FIG. 8 is connected with a stand tube 16 via a connection bush 25 and is secured by a ring 26, so that the tubular arm 2 is rotatable about axis Y and forms a suspended connection. In contrast, the connection bush 25 in FIGS. 13 and 14 is arranged at the bottom for a sitting connection.

FIG. 11 shows section C—C according to FIG. 8 and additional details beyond those shown in FIG. 6.

FIG. 12 shows a complete stand 1 which is constructed as a movable base stand by means of a corresponding base 26 with wheels 27 and is provided with a lamp 4.1 which is connected via a power supply cable 24 (FIG. 8) and transformer 28. The stand 1 is provided with a handle 29 for spatial adjustment.

The arm 2 shown in FIGS. 8, 10, 11 and 14 represents the special case of the upper rest position of the arm 2. When the arm 2 is moved downward, the spindle 6, including the extension (fork) 9, moves relative to the arm for the purpose of compressing the compression spring 3, so that the spring force of the first spring stop 7 on the indentation 13 is increased and a weight balancing of a load 4, 4.1 is carried out depending on the position of the arm.

What is claimed is:

1. An adjustable stand (1) for supporting a load (4) in a manually predetermined vertical position, said stand comprising a pivotable tubular arm (2) to which said load (4) is adapted to be connected; an arm joint (5) by which said pivotable tubular arm is pivotally connected to a connection part (22); a spindle (6) arranged in the tubular arm (2) and a compression spring (3) received in a frictional engagement by said spindle (6) and provided with a given pretensioning by means of a first spring stop (7) in the form of a washer at one end of said spring (3) through which said spindle (6) extends and by a second spring stop (8) at another end of the spring (3);

wherein said spindle (6) has an axial extension (9) in the vicinity of the first spring stop (7), said axial extension (9) is pivotally connected with the connection part (22) by means of a lever (11), said lever (11) is pivotally connected by a first pivot joint (10) to the axial extension (9) and with a second pivot joint (12) to said connection part (2), said first spring stop (7) bears on said axial extension (9), said tubular arm (2) is provided with two opposing indentations (13) located in the vicinity of said first spring stop (7) and having a distance (X) from one another, said washer forming said first spring stop (7) has two opposing first sides (14) closer to each other than said indentations (13) are to each other and two opposing second sides (15) arranged rotated 90° relative to the first sides (14) and spaced further from each other than said indentations (13) are from each other, so that said washer may be moved by said indentations (13) during assembly and rotated 90° to take a bayonet locking position; and wherein the spindle (6), the first and second spring stops (7,8), the compression spring (3), the axial extension (9) and the lever (11) with the first pivot joint (10) and the second pivot joint (12) are constructed together as a structural unit (18); whereby the first sides (14) are formed so that, when said washer is in the bayonet locking position and is axially rotated, the first sides (14) are jammed against the indentations (13), so that the second sides (15) cannot be unintentionally rotated out of the bayonet locking position, but only deliberately by axially pressing in and rotating said structural unit (18) so as to relieve said structural unit (18).

2. The adjustable stand as defined in claim 1 wherein said tubular arm (2) has a rectangular or circular cross-section.

* * * * *